July 7, 1959 H. SCHWEICKERT ET AL 2,893,847
APPARATUS FOR PREPARING ROD-SHAPED, CRYSTALLINE BODIES, PARTICULARLY SEMICONDUCTOR BODIES
Filed Feb. 18, 1955 4 Sheets-Sheet 1

July 7, 1959 H. SCHWEICKERT ET AL 2,893,847

APPARATUS FOR PREPARING ROD-SHAPED, CRYSTALLINE BODIES, PARTICULARLY SEMICONDUCTOR BODIES

Filed Feb. 18, 1955 4 Sheets-Sheet 2

July 7, 1959 H. SCHWEICKERT ET AL 2,893,847

APPARATUS FOR PREPARING ROD-SHAPED, CRYSTALLINE BODIES, PARTICULARLY SEMICONDUCTOR BODIES

Filed Feb. 18, 1955 4 Sheets-Sheet 4

United States Patent Office 2,893,847

Patented July 7, 1959

2,893,847

APPARATUS FOR PREPARING ROD-SHAPED, CRYSTALLINE BODIES, PARTICULARLY SEMICONDUCTOR BODIES

Hans Schweickert and Joachim Haus, Pretzfeld, Germany, assignors to Siemens-Schuckertwerke Aktiengesellschaft, Berlin-Siemensstadt, Germany, a German corporation Application February 18, 1955, Serial No. 489,177

Claims priority, application Germany February 23, 1954

24 Claims. (Cl. 23—273)

Our invention relates to an apparatus for the preparation of rod-shaped crystalline bodies, particularly semiconductor bodies.

Rod-shaped crystalline bodies, especially from semiconductor materials, have been produced in the past by preparing a melt of the material in a heated refractory crucible and continuously pulling a crystal out of the melt. This is done by fastening a seed crystal of the same material to holder movable perpendicularly with respect to the melt surface, dipping the crystal into the melt and withdrawing it slowly, together with a drop of molten material that adheres to the lower end of the growing crystalline body. The drop of molten material solidifies a short distance from the point of withdrawal so that a stalactite-like rod results. In this manner, single crystals are prepared, for example, from germanium, silicon, or from semiconducting compounds such as $A_{III}B_{V}$ compounds of elements in the third and fifth groups of the periodic system, or $A_{II}B_{VI}$ compounds of elements in the second and sixth groups of the periodic system. After subdividing these monocrystalline bodies into small parts, such parts are used in making rectifiers, transistors, thermistors, photocells and other devices. In order to obtain a uniform cross section over the entire length of the rod pulled from the melt, the temperature of the liquefied material must be kept accurately constant. This is facilitated, according to one process, by means of continuously adding new material to keep the level of molten material constant while the crystal is pulled from the melt. Thus, the method comprises not only pulling a crystalline rod from the surface of the melt, but also continuously adding process material to the melt from above. Obviously, the volume of the melt must be relatively large for this purpose, in any case not substantially smaller than the volume of the rod pulled from the melt.

It is another object to operate, by virtue of the employment of a small amount of liquid material, with a more economic heat input.

It is still another object to operate under conditions which readily facilitate temperature regulations.

It is a still further and principal object of the invention to operate under conditions which readily permit the introduction, or alternate introduction, of various additional materials into the melt and from there into the growing crystalline body.

These and other objects and features of this invention will appear more fully from the following detailed description, when read in conjunction with the drawings, in which—

Figure 1:
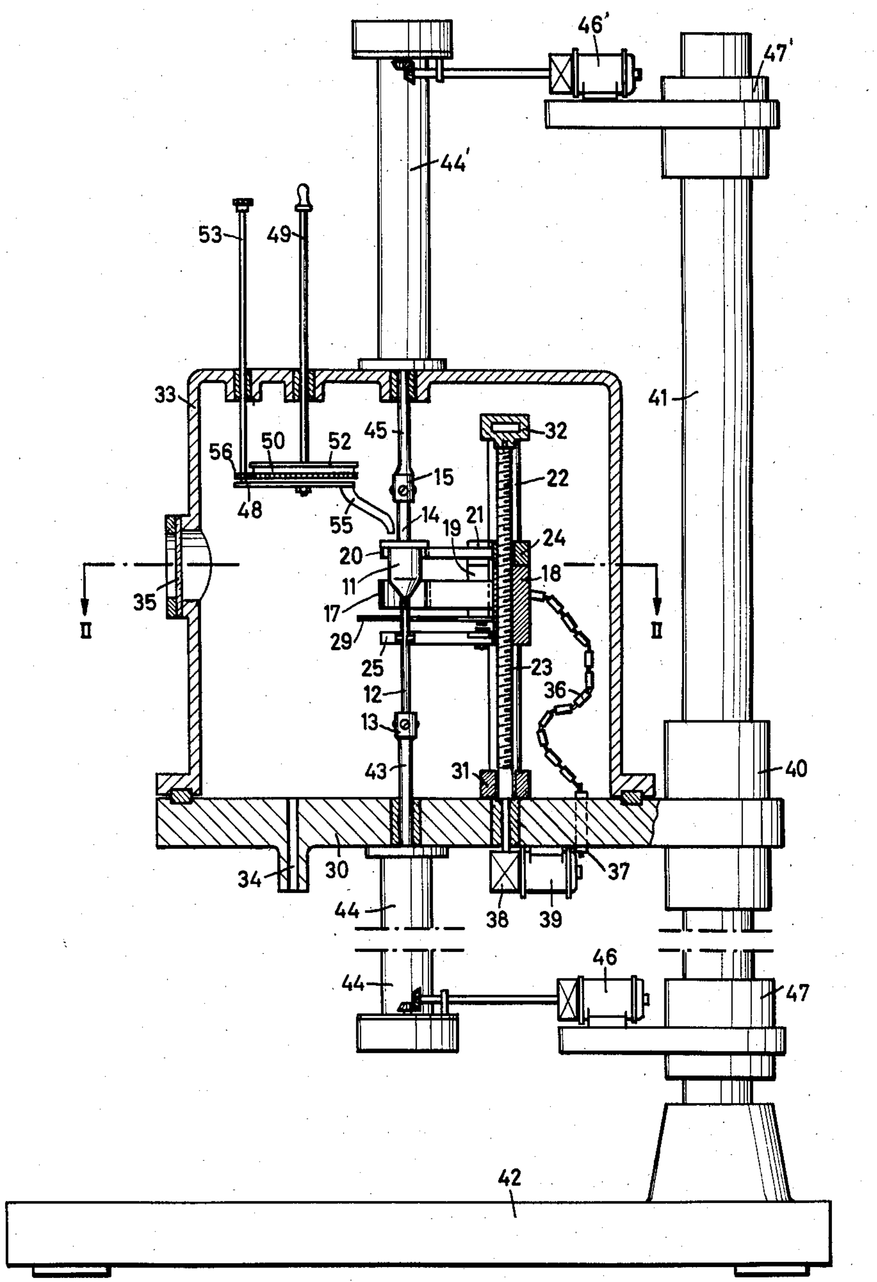
Figure 2:
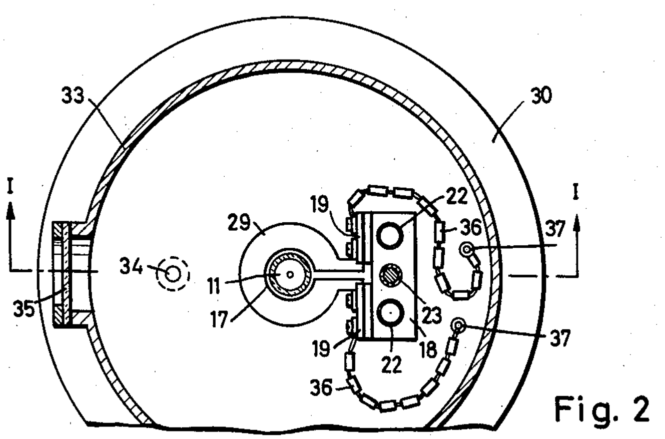
Figure 3:
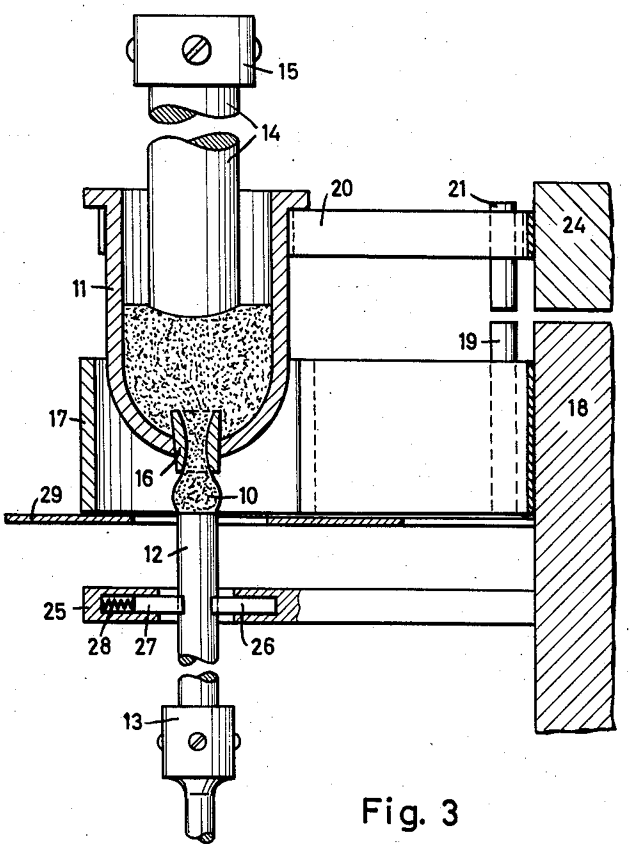
Figures 4, 5, 6, 7, 8, 9, 10:
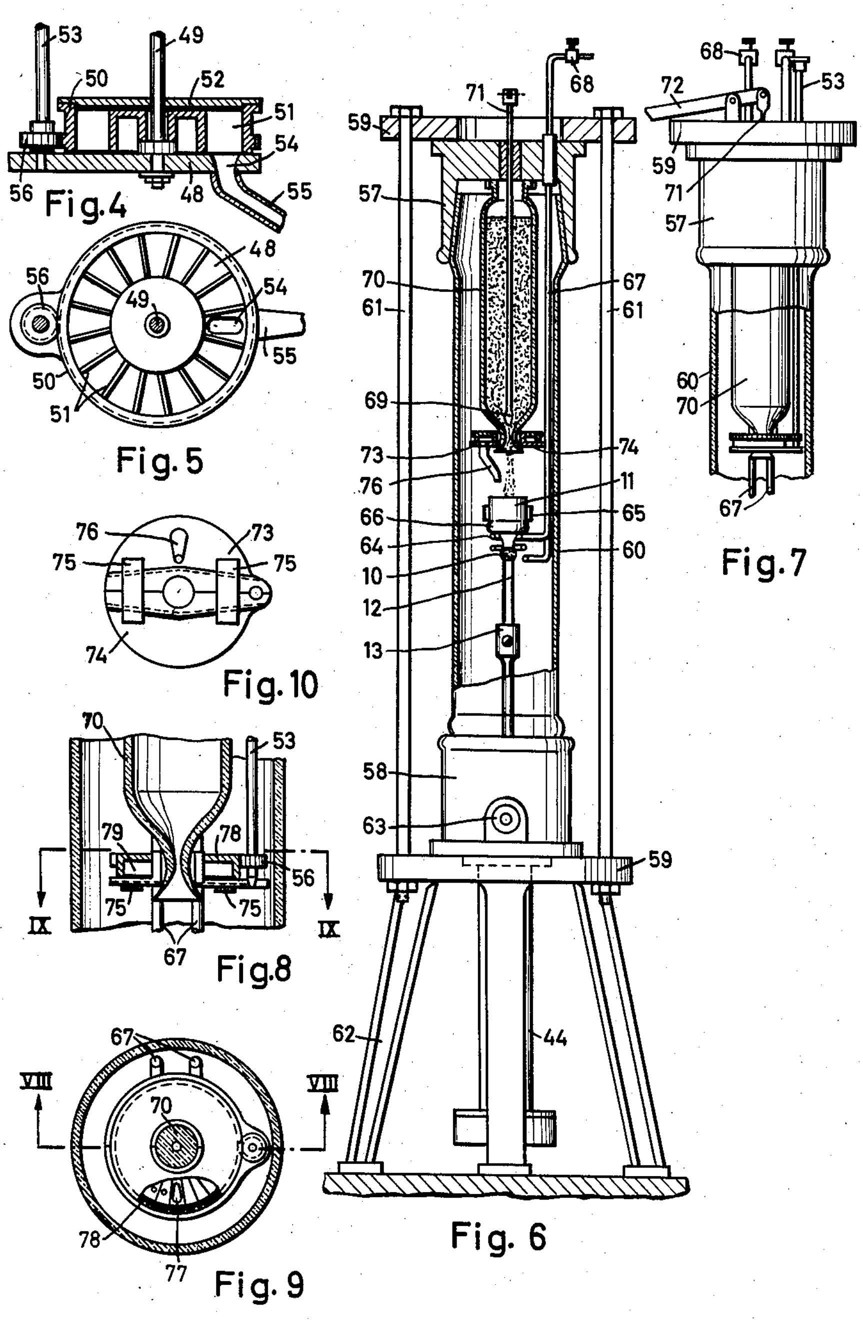

Fig. 1 is a side view, partly sectional, of one embodiment of an apparatus of this invention, Fig. 2 is a horizontal sectional view of the apparatus, taken on the line II—II in Fig. 1, Fig. 3 is an enlarged sectional view in elevation of the elements immediately concerned with the melting process, Figs. 4 and 5 are enlarged vertical and horizontal sections, respectively, of auxiliary elements for supplying the melt with additional materials, Fig. 6 is a front elevation, partly sectional, of another embodiment of the herein-claimed apparatus, comprising a transparent quartz tubing, Fig. 7 is an enlarged side view of part of the same apparatus, Figs. 8, 9 and 10 are enlarged detail views of elements shown in Figs. 6, 7, and Figs. 11 to 15 illustrate various forms of the required melting crucible and changes of the apparatus necessitated thereby.

We have discovered that, in pulling a monocrystalline body from a melt, the amount of liquid material can be kept particularly small, say 1 ccm. and less, if the body is pulled from the melt from a direction differing from that of the supply of material thereto. Under these conditions, a very small crucible may be used, for example, a crucible whose inside diameter need be only slightly larger than the diameter of the body which is to be produced, so that the crucible contains, at most, one tenth of the amount of material necessary for the finished product. Thus, if the rod-shaped body is 20 cm. long and its cross-sectional area is 0.8 $cm.^2$, a crucible having a capacity of 1.5 cubic cm. and less suffices. The amount of liquid material actually contained in the crucible during the pulling process is, preferably, less than $\frac{1}{30}$ of the entire amount of material going into the finished rod.

In accordance with the present invention, an apparatus is provided which comprises a melting crucible having a withdrawal opening below the surface of the liquid melt and, facing this opening, a support for the crystalline rod which is movable with respect to the crucible so that the solidifying end of the ingot or melting rod always remains a short distance from the withdrawal opening of the crucible. Because of the small volume of molten material and the consequently low fluid pressure, only a small amount of liquid leaves the crucible at any one instant. This amount of liquid solidifies as the rod is gradually moved away from the crucible, and is continuously replenished by liquid emerging from the discharge opening at the same ratio as the rod grows. The speed of pulling can be adjusted in accordance with the rate at which the liquid emerges through the opening, so that a crystalline rod of uniform cross section is obtained.

When working according to known pulling methods whereby a rod-shaped body is obtained by pulling off the liquid surface, the cross-sectional area of the resulting rod is relatively large and fixed within rather narrow limits, because of the surface tension of the adhering liquid drop. Consequently, for the making of rectifiers, asymmetrical conductors, transistors and the like, which require only very small finished bodies, the cross section of the crystalline rod resulting from the pulling process must be reduced by sawing or cutting. In contrast thereto, according to the herein-claimed method, the diameter of the rod is determined by the size of the withdrawal opening and the height of the liquid above the withdrawal opening (which in turn depends upon the amount of heat supplied) as well as by the speed of withdrawal of liquid through the opening. At a given size opening, the speed of withdrawal may be varied within certain limits, governed by the surface tension of the molten material. In this manner, by means of mutually adjusting the afore-named factors, crystalline rods of any desired cross section may be obtained. For example, it is possible to pull the rods so thin that, by simply cutting discs therefrom, finished semiconductor bodies for rectifiers, asymmetrical conductors, transistors and the like can be prepared without the need of any further subdividing.

Because of the possibility of additionally altering the cross section of the resulting crystalline body by changing the size of the withdrawal opening and the pressure of the liquid melt at the point of withdrawal, the herein-disclosed method is even superior to the newly developed process involving vertical zone melting without a crucible. As against the older method of zone melting in an oblong crucible in horizontal position, the herein-disclosed new method has the same advantage as melting without a crucible, namely that at the time of solidification the melt is not in contact with the crucible so that it will neither fuse to the crucible nor adsorb foreign substances from the crucible walls.

Referring, for a more detailed description, to the drawings, Fig. 1 to 3 illustrate a crucible 11 which may, for example, be made of graphite, magnesium oxide or aluminum oxide. These materials are characterized by high temperature stability, graphite up to 3000° C., magnesium oxide up to 2500° C., and aluminum oxide up to 2000° C. Graphite is particularly suited for the treatment of germanium, and also indium-antimonide and similar semiconductor compounds because they do not react with graphite. Although graphite and various other semiconductor compounds, such as silicon and aluminum-antimonide, react with each other, the resulting carbides are stable, so that, once such a carbide coating has been formed, the crucible is no longer attacked and the melt is not contaminated. The crucible, containing, for example, 1/30 of the required amount of material in liquid form, has an opening at the bottom through which liquid material emerges. There is shown, underneath this opening, the finished portion 12 of a crystalline rod whose lower extremity is held by a clamping support 13. A drop 10 of the melt, which has emerged from the opening and moved into the space between the crucible and the upper end of the rod, undergoes from below a cooling and solidification process, and becomes part of the rod which consequently grows in an upward direction. The clamping support 13 is axially movable so that, by means thereof, the growing crystalline rod is moved in a downward direction. From above, the crucible is supplied with more material, for example material in solid form, by means of a rod supply 14, made from appropriate material by pressing, sintering or melting in a boat, or by casting the material into a mold. The supply rod 14 is held by a clamping support 15 and is lowered into the crucible 11 as shown. The withdrawal opening at the bottom of the crucible 11 may consist, for example, of a nozzle 16 made of the same material as the crucible, or from other suitable materials, and projects, inside as well as outside, beyond the crucible wall. The projecting of the rim of the nozzle into the interior of the crucible has the advantage that in treating aluminum-antimonide for example, any reaction product formed or collecting on the inner crucible walls at the interface between supply material and crucible, is held back within the crucible instead of emerging with the melt. The projection of the lower rim of the nozzle down from the crucible prevents the spreading of the melt over the outer bottom wall of the crucible, and thus permits the pulling of crystalline rods having cross sections as small as desired.

The lower part of the crucible 11 is surrounded by an annular heating device 17, preferably in such a manner that the withdrawal opening of the crucible is about within the center of the heating ring. The latter is illustrated as a resistance heater acting by radiation, but can be obviously replaced by an inductively acting heating coil. The illustrated heating device consists, for example, of a strip of molybdenum or tungsten sheet, the ends of which are clamped to a bracket 18 of copper or the like or, preferably, to brass plates 19 held by the bracket 18 with an insulation therebetween and provided with movable leads 36 connected to an adjustable current transformer. The upper rim of the crucible 11 is held by a support 20 which, by means of clamping plates 21, is fastened to a separate upper bracket 24 to enable separation of the support 20 from the heating element during operation of the device. Similarly to the heating element, the support 20 advantageously consists of a resistor sheet which serves as a preheater for the crucible 11. For this purpose, it is mounted insulated from the bracket 24 and, by means of leads, is connected to a heating transformer. By contacting the clamp plates 21 with the clamp plates 19, the preheater can be connected to a common current transformer parallel to the main heating element 17. The bracket 18 is slidingly mounted between two vertical steel guide pins 22 and can be moved up and down by means of a spindle 23. The guide pins are fitted into a steel base plate 30, and the ends of the guide pins are connected with each other by means of cross beams 31, 32. The guide pins are preferably hollow to accommodate cooling water which is supplied to one of the two guide pins from below, through the base plate 30. After passing to the other guide pin through the cross beam 32 which is likewise hollow, the cooling water leaves again through the base plate 30.

The upper bracket 24 is also slidingly mounted on the guide pins 22 but is not actuated by the spindle 23, so that, after bracket 24 has been fixed in position, the bracket 18 underneath can be moved alone up and down. This way it is possible to again liquefy successive zones of a finished crystalline rod if this should become necessary for additional purification or for the making of a single crystal.

For this purpose, the preheating device 20 is shut off and, temporarily, the heating device 17, so that the crucible 11 freezes to the upper end of the rod 12. The crucible is thus fixed in position and serves, during the subsequent zone melting, as support for the upper end of the melting rod 12.

The entire apparatus is covered by a steel dome 33, fitting air-tight onto the base plate 30 and provided with a show glass 35. The base plate 30 has a nipple 34 to connect a vacuum pump, or a container of inert gas, to the apparatus, so that the pulling process can be carried out at high vacuum or in a protective atmosphere of oxygen or nitrogen. Insulating sleeves 37 are provided for passage of the leads 36 of the heating current through the base plate. The lower end of the spindle 23, extending into a smooth pin, also passes through an air-tight mounting within the base plate and is coupled underneath thereof with the gear 38 of an adjustable driving motor 39. The base plate is held by a bushing 40 that can be adjusted in position and by means of which the entire device is displaceable along a support column 41, extending from a pedestal 42.

The upper end of the melting rod 12 is advantageously held, particularly if the rod is very thin, by means of a movable collar 25 extending from the bracket 18 a short distance below the melting zone. This permits centering of the rod exactly below the crucible opening. The collar contains several oppositely-mounted pins 26, 27, arranged to contact the melting rod 12. At least one of the guide pins should be yieldable, for example, by being biased by a spring 28. In adidtion, a heat reflector 29, say, in form of an annular disc of nickel sheeting, is fastened to the bracket 18 and is preferably mounted between the discharge opening of the crucible 11 and the solidifying upper end of the rod 12. Another similar reflector can be also mounted about the rod 14 above the crucible 11 by fastening it to the bracket 24.

Inasmuch as the clamping supports are movable along the axis of the melting rod, a number of combined movements may be carried out. Thus, according to a first combination, the crucible 11 remains stationary while the growing melting rod is moved downward and material is furnished from above by means of the supply rod 14 which is gradually lowered into the crucible. According to another possibility, the supply rod 14 is kept stationary, while the crucible 11 is gradually moved upward and the growing melting rod is slowly moved downward. According to a third combination, the melting rod is kept stationary while, as the melting rod grows, the crucible 11 and, at a lower speed, the supply rod 14 are moved in an upward direction. A still further combination provides for a simultaneous downward movement of the melting rod, particularly if an especially thin melting rod is to be produced. In addition to their axial movements, the rods 12 and 14 can be given a rotary movement. Turning of the supply rod 14 produces a mixing effect upon the melt in crucible 11. Turning of the melting rod 12 results not only in a uniform, rotationally-symmetric shape but, due to centrifugal forces, such turning produces, particularly at higher rotational speed, migration of undissolved impurities toward the periphery of the still liquid or semi-liquid portion of the melting rod, from where they may be readily removed afterwards by chemical and/or mechanical means.

In order to attain the afore-described movements, the two clamping supports 13 and 15 are attached to the free ends of shafts 43 and 45 respectively, the former passing through an air-tight fitting inserted into the base plate 30 and the latter passing in a similar manner through the top of the dome 33. These shafts are coupled to gears 44 and 44', and each of the two gears is driven by two motors (of which only the motors 46 and 46' are shown in the drawing) which provide the shafts 43 and 45 with rotatory motion and, independently therefrom, move them up and down in the direction of the axis. As shown, the motors 46 and 46' are mounted on adjustment bushings 47, 47' held by the support column 41.

Operation of the apparatus is as follows. When the dome 33 is raised, a single crystal seedling, consisting of a short piece of a previously-prepared monocrystalline rod, is fastened to the lower clamping support 13. The upper clamping support 15 is provided with a supply rod 14, made by sintering raw material into a rod of proper dimensions. After lowering the dome 33 into closed position, the bracket 18 is moved upwards together with the heating ring 17 as well as the upper bracket 24 and the crucible 11, supported thereby, until the lower end of the supply rod 14 reaches into the crucible 11. As the next step, the lower clamping support 13 is raised until the seedling attached thereto just touches the crucible 11. After creating the necessary high vacuum, the heating circuit is closed so that the lower end of the supply rod 14 melts. Simultaneously, the upper end of the crystal seedling liquefies and a drop of molten material issuing from the bottom opening of the crucible 11 merges therewith. While continuously rotating, for example at 400 revolutions per minute, the growing melting rod 12 is slowly lowered in position, for example at a speed of the order of 0.5 to 5.0 mm. per minute. The speed at which the supply rod 14 is lowered depends upon the rate at which the melt is used up. By means of continuously rotating the supply rod, for example at 300 revolutions per minute, the melt contained in the crucible is well agitated.

In order to provide the melt with additional substance, say, for attaining p-n or n-p junctions respectively, or a succession of such junctions, in order to make, for example, semiconductor crystals having successive zones of different electric properties, the apparatus of Fig. 1 includes a device, shown in detail in Figs. 4 and 5, for furnishing such additional substances, which are intended to change the composition of the melt during growth of the crystal. This device comprises a plate 48, held by the lower extremity of a vertical shaft 49 which, embedded in an air-tight sleeve, extends from the top of the dome 33 and is sufficiently long to permit manual adjustment of the position of the device in accord with the upward and downward movements of the crucible 11. Mounted above the plate 48, so as to be rotated by shaft 49, is a low, hollow gear cylinder 50, the interior of which is subdivided into a plurality of compartments by means of radially-inserted plates 51. When the dome 33 is raised, the compartments can be charged with selected additional substances in a previously-prepared form, say in the form of one or several pills pressed from powdery material according to a desired addition scheme. The top of the cylinder is closed by the cover 52. The spur gear of the cylinder 50 meshes with a pinion 56 which may be turned by means of a shaft 53 extending from the top of the dome and inserted in the latter by means of an air-tight sleeve. Upon rotating the cylinder, the pills are carried along by adjacent intersections 51 until one or several of the pills reach the cut-out 54 in the plate 48, tumble through a dropping tube 55 and descend into the crucible 11. The shaft 53 can be rotated by hand, at time intervals in accord with the addition scheme, or can be actuated by means of a suitable coupling drive or an electric drive in synchronism with the crystal pulling motion.

Figs. 6 to 10 inclusive illustrate another embodiment of the apparatus the crystal pulling elements of which are arranged within a transparent quartz tube 60 having at each end ground-in, metallic thimbles or covers 57, 58. By means of end plates 59 and tension bars 61, these covers are made into air-tight seals. The framework, consisting of the end plates and tension bars, is mounted on a pedestal 62. The thimble 58 has a nipple 63 for attaching a pump producing high vacuum or a tank with inert gas to the apparatus. For heating purposes, an induction coil 64 is provided in this instance which, at the same time, serves as support for the melting crucible 11'. To be held in this manner, the crucible has a collar 66, as shown, slightly above its bottom opening. Obviously, the heating coil 64 can be also arranged outside of the quartz tube and the crucible be held by other means.

The induction coil 64 and the leads 67 thereof consist of a single piece of a copper conduit, the ends of which pass through the upper cover 57 in an air-tight manner. Clamps 68 connect the ends of the conduit with a high frequency generator, operating, for example, at a frequency of several million cycles per second. Moreover, the ends of the conduit have rubber tubing attached thereto in order to pass cooling water through the induction coil 64. A closed heating ring 65 made from a sheet of tungsten, molybdenum or nickel and resting against the collar 66 is furnished for the purpose of preheating the crucible 11'.

A supply of pulverulent raw material is contained in glass reservoir 70, which is detachably fastened to the upper cover 57, preferably by means of a bayonet locking. The glass container 70 has a constricted discharge opening at its lower end, in the nature of the passage of an hour glass, so that the finely comminuted semiconductor powder issuing from the container reaches the melting crucible 11' in form of a thin stream. The discharge opening can be closed by means of a stopper 69 attached to the lower end of a rod 71. This rod extends upward through the cover 57 where it is held by means of an air-tight sleeve. At the upper end, the rod 71 is hinged to a fulcrumed hand lever 72 so that, by operating the lever, the stopper 69 may be raised or lowered.

Fig. 6 illustrates a drop 10' of the melt emerging from the discharge opening of the crucible 11' and, underneath thereof, the solidified melting rod 12 fastened to the clamping support 13. By means of a positioning device 44, the principle of which has been described in conjunction with Fig. 1, the growing melting rod can be withdrawn in a downward direction and be rotated independently from the downward movement. The motors actuating the device 44 have not been shown in Fig. 6.

As shown in Figs. 6 and 7, a device for furnishing additional substances is attached to the lower end of the container for supply material. The device is shown in detail in Figs. 8 to 10. The fixedly mounted part of the device consists of two halves 73 and 74, placed individually about the neck of the container for supply material 70 and joined to each other by means of clamping pieces 75, held by means of wedge-like, dovetail guides against the parts 73 and 74. The former has a boring 77 and a dropping tube 76 attached thereto. The rotatably-mounted upper part of the device consists of a hollow gear cylinder 78 that is closed on one side and is equipped with partitions 79. In mesh with the gear cylinder is a pinion 56, mounted at the end of a shaft 53 that extends from the upper cover 57, held by an air-tight sleeve inserted in the cover.

In order to charge the device for furnishing additional substances and to attach it to the supply container 70, the two are turned upside down. Measured quantities of additional substances, preferably in form of pills, are placed into the individual compartments of the upper part 78. As the next step, the upper part 78 is placed about the neck of the supply container 70, whereupon the two lower parts 73 and 74 are inserted and fastened to each other by means of the two clamping pieces 75. Having fastened the device for furnishing additional substances to the supply container 70, the latter is turned into upright position, filled with supply material, fastened to the upper cover 57 and inserted in the quartrz tube 60, together with the heating coil 64, the crucible 11′ supported by the heating coil, and the heating ring 65. Previously thereto, the stopper 69 is lowered to cover the discharge opening of the supply container in order to close the same. In addition, the pinion 56 is brought in meshing contact with the spur gear of the cylinder 78.

To commence the operation, a seed crystal, fastened to clamping support 13, is moved upward, together with the latter, by means of the positioning device 44 until the discharge opening of the crucible 11′ is closed thereby. The stopper 69 is raised until the crucible is partly filled with powder from the supply container 70. After evacuating the interior of the quarz tube 60, the circuit of the high frequency heater is closed. As long as the semiconductor material lacks a sufficiently high conductivity for inductive heating, the closed circuit will heat the auxiliary heating ring 65. Heat therefrom is transmitted through the walls of crucible 11′ containing the powder, until the latter agglomerates and its conductivity increases so that henceforth the heat, necessary for the melting, is produced by high-frequency induction currents generated within the semiconductor material itself. As a result, the amount of energy transmitted to the auxiliary heating ring 65 diminishes automatically so that, subsequently, the ring 65 serves only as a preheater. Upon liquefaction of the crucible content and of the upper end of the seed crystal, material will pass through the crucible opening and, by means of actuating the positioning device 44, the pulling operation may be commenced. The necessary fresh supply of material in form of a pulverulent trickle is obtained by lifting the stopper 69. Additional substances are furnished in a manner similar to that described in connection with Fig. 1 in that, by means of the pinion 56, the upper part 78 of the supply device for additional substances is intermittently turned to place another compartment into position for discharging a pill of additional material through the dropping tube 76 into the crucible 11′.

Figure 11:
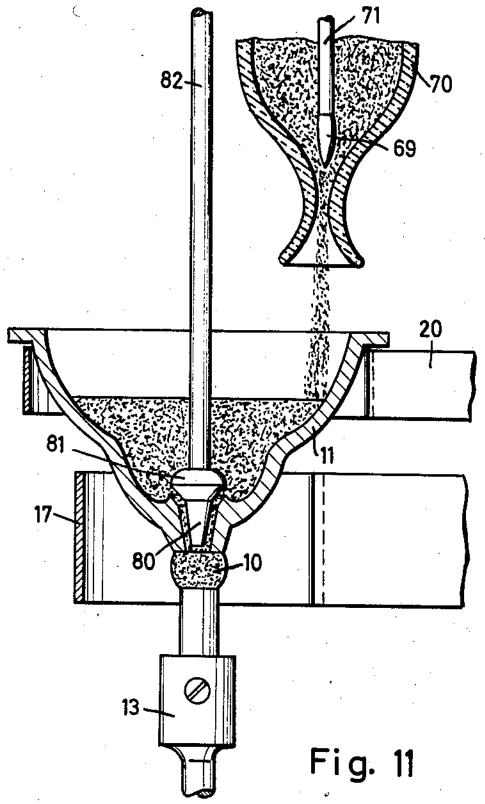

Fig. 11 is another embodiment of the part of the device shown in detail in Fig. 3. According to Fig. 11, the cross section of the discharge opening of the melting crucible 11″ can be regulated by means of a needle 80 which is axially adjustable. At the upper end, the needle 80 is provided with a flange 81 which permits complete closure of the discharge opening. Needle and flange are fastened to the lower end of a rod 82 which may be clamped into the upper support 15 of the arrangement disclosed in Fig. 1 in lieu of the supply rod 14 shown there. According to Fig. 11, comminuted or pulverulent material for the melt is furnished from a supply container 70′, having the constricted discharge opening of an hour glass, previously described in connection with Fig. 6. If employed in connection with the arrangement of Fig. 1, the supply container may be fastened to the upper bracket 24.

Figure 12:
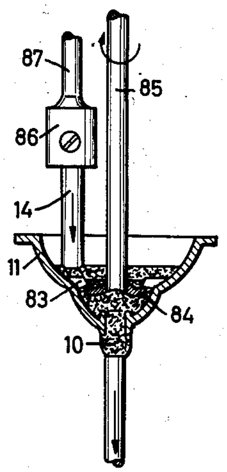
Figure 13:
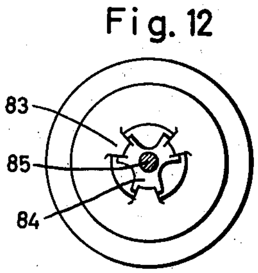

According to still another embodiment shown in Figs. 12 and 13, the crucible 11″ can be turned about a vertical axis passing through its discharge opening. For this purpose, the crucible is provided with interior projections 83, adjacent to similarly arranged arms 84 of a rod 85, consisting of heat-resisting material which is the same as or is similar to that of the crucible. This rod can be fastened to the upper clamping support 15 of the arrangement shown in Fig. 1, to be rotated together with the clamping support by the positioning device 44′. A rod of supply material 14 is held by the additional support 86 which, if employed in conjunction with the embodiment shown in Fig. 1, extends in an air-tight manner parallel to the shaft 45 through the top of the dome 33 and, by means of suitable positioning means, is slowly moved in a downward direction. A rotational movement of the rod 14 is not desirable, since a non-rotating supply rod tends to agitate the melt within the crucible 11 rotating about the axis.

Figure 14:
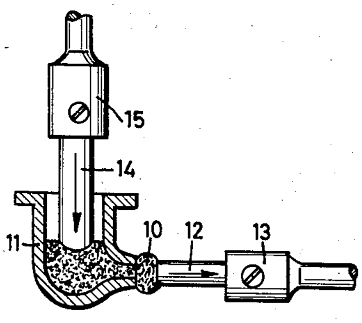

Fig. 14 illustrates an arrangement including a crucible 111 having a lateral discharge opening and a clamping support 13′ for the melting rod 12 coaxially with the discharge opening at one side of the crucible, so that the crystal is pulled in a horizontal direction. In this case, the crucible and the heating elements are preferably fixedly mounted. Supply material may be added either in comminuted or pulverulent form, as previously described.

Figure 15:
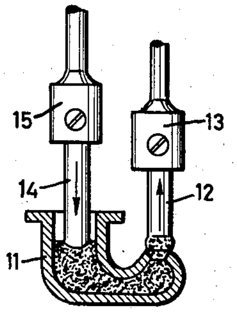

According to Fig. 15, the melting crucible 211 comprises a U-tube, the two parts of which are of different length. The clamping support 13″ for the crystalline rod 12 is above the discharge opening of the shorter part of the U-tube, while the supply material is furnished, say in form of a rod 14, to the longer of the two parts of the U-tube. With this arrangement, the melting rod is pulled in an upward direction. However, the difference between this and known methods of pulling a rod from a melt is that, according to the known methods, the rod is pulled out of the free surface of the melt while, according to Fig. 15, a special discharge opening is provided, the diameter of which and difference in height against the surface of the melt in part determine the cross section of the resulting melting rod. Moreover, impurities which perhaps form a reaction product coating of the supply material are retained within a crucible of this form.

The changes required as against Fig. 1 in the position of supporting and operating elements in view of the different location and direction of growth of the melting rod appear to be obvious and may be readily deduced from the previous description.

The processes and devices of this invention are applicable to crystalline substances in general, including elementary substances such as silicon or germanium, as well as compounds such as semiconducting $A_{III}B_V$ compounds, for example AlN, AlP, AlAs, AlSb, GaN, GaP, GaAs, GaSb, InP, InSb, BP, or semiconducting $A_{II}V_{VI}$ compounds such as HgSe, InS, CdTe, HgTe. Moreover, the herein-claimed invention has been found particularly applicable in the preparation of melting rods from metals having a high melting point, such as titanium and zirconium, as well as high melting alloys thereof. Such melting rods may be advantageously used as shafts, or sections thereof as shaft ends and the like.

We claim.

1. Apparatus for preparing a material in the form of a crystalline body, particularly a semiconductor body, by pulling a crystal from a melt, which comprises a stand, an air-tight compartment mounted on said stand, means for adjusting the atmospheric conditions within said compartment, a melting crucible containing said melt therein and having a bottom discharge opening mounted within said compartment, an annular main heating device positioned about the lower portion of said crucible, an auxiliary annular heating device positioned about the upper portion of said crucible, a clamping support for a rod-shaped body of said material having an end facing said discharge opening, means for reciprocating said clamping support to and from said discharge opening, means for rotating said clamping support about its axis independently of its reciprocating movement, means for supplying said melting crucible with adjustable amounts of principal material, means for supplying said melting crucible with adjustable amounts of additional material intended to change the composition of the melt, and leads connecting said main heating device and said auxiliary heating device to a source of electric energy.

2. Apparatus for preparing crystalline bodies, particularly semiconductor bodies, by pulling a crystal from a melt, which comprises a stand, a column rising from said stand, a base plate fitted movably to said column, a dome forming an air-tight compartment in contact with said base plate, means for adjusting the atmospheric conditions within said compartment, two hollow, vertical rods with a hollow cross piece on top fitted to said base plate, connections extending outside to run cooling water to said rods and cross piece, a spindle centered between said rods, an upper and a lower bracket held by said spindle, means for fixing said upper bracket in position, means connected from the outside to said spindle for moving said lower bracket up and down by rotating said spindle, an annular auxiliary heating device fastened to said upper bracket, a melting crucible containing said melt therein and having an upper rim and a bottom discharge opening held at the upper rim by said auxiliary heating device, an annular main heating device fastened to said lower bracket and normally positioned about the lower portion of said crucible, a first clamping support for a rod-shaped body of said material facing said discharge opening, means, actuated from the outside, for reciprocating said first clamping support to and from said discharge opening, means, actuated from the outside, for rotating said first clamping support about its axis independent of its reciprocating movement, a second clamping support for a rod-shaped body of principal material facing the top opening of said crucible, means, actuated from the outside, for axially moving said second clamping support to and from said top opening to supply said crucible with adjustable amounts of principal material, means, actuated from the outside, for rotating said second clamping support about its axis independent of its axial movements to agitate the melt in said crucible, means for supplying said crucible with adjustable amounts of additional material intended to change the composition of the melt, a show glass in the side wall of said dome, and leads connecting said main heating device and said auxiliary heating device to a source of electric energy.

3. Apparatus for preparing crystalline bodies, particularly semiconductor bodies, by pulling a crystal from a melt, which comprises a stand, a transparent quartz tube with ground-in, metallic covers at the ends fitted vertically to said stand, means, for adjusting the atmospheric conditions within said quartz tube, induction heating means mounted inside said quartz tube which comprise as a main heating source a coil or copper tubing forming a conduit for cooling water to pass through said coil and an auxiliary heating ring, a melting crucible containing said melt therein and having a flange near the bottom and a bottom discharge opening, said crucible being held by the uppermost loop of the coil of said main heating source so that the main heating source heats the lower section of said crucible and said auxiliary heating ring heats the upper section, a clamping support for a rod-shaped body facing said discharge opening, means, actuated from the outside, for reciprocating said clamping support to and from said discharge opening, means, actuated from the outside, for rotating said clamping support about its axis independent of its reciprocating, suspended within the quartz tube from the top metallic cover a storage container for granular principal material, said container having a drainage duct and a manually-operated stopper for supplying said melting crucible with adjustable amounts of principal material, means for supplying said melting crucible with adjustable amounts of additional material intended to change the composition of the melt, and leads connecting said main heating source and said auxiliary heating ring to a source of electric energy for induction heating.

4. Apparatus for preparing crystalline bodies according to claim 1, wherein said means for supplying said melting crucible with adjustable amounts of additional material intended to change the composition of the melt comprise a fixedly-mounted disc having a lateral cutout with a drain attached thereto, a short hollow gear cylinder with a plurality of partitions inside mounted rotatably in contact with said disc, a shaft extending from the outside of said compartment toward said gear cylinder, a detachable cover for said gear cylinder, and a pinion at the end of said shaft meshing with said gear cylinder.

5. Apparatus for preparing crystalline bodies according to claim 4, wherein said means for supplying said melting crucible with adjustable amounts of additional material intended to change the composition of the melt is suspended from a vertical rod extending from, and held movably by, the top of said compartment.

6. Apparatus for preparing monocrystalline bodies, particularly semiconductor bodies, which comprises a crucible containing, when in operation, a melt of material from which the crystal is to be pulled, said crucible having a discharge opening below the surface of the melt, a clamping support device movable outwardly and away from said discharge opening and operative to pull a crystalline body from the melt through said discharge opening, said crucible having a melt-receiving capacity of $\frac{1}{10}$ to $\frac{1}{30}$ of the material constituting the finished crystalline body, and means for adding melt material to said crucible at the rate at which the melt is diminished during the pulling of said crystalline body.

7. An operational assembly for making a crystalline semiconductor body, by pulling a crystal from a melt of material, comprising a melting crucible, containing said melt therein, means for supplying the material to the inside of the crucible in controlled amount, the crucible having a restricted withdrawal opening in its bottom below the surface of the melt, the crucible having a capacity not more than one-tenth of the amount of material necessary for the finished product, the inside diameter of the crucible being only slightly larger than the diameter of the body which is being produced, and, facing the withdrawal opening, and adjacent thereto, an end of a seed crystal of the said crystalline semiconductor body, means for supporting the seed crystal, for centering its axis with respect to the withdrawal opening and for adjusting the distance between the crystal pulled thereby and the withdrawal opening, and for turning the pulled crystal about an axis passing through the withdrawal opening, and for lowering the pulled crystal, and radiant heating means about the lower portion of the crucible including the withdrawal opening.

8. The invention defined in claim 7, a rod of the said material, the means for supplying the material to the crucible comprising means to support the rod of said material, and for lowering the rod, and means for turning it to stir the melt.

9. The invention defined in claim 7, in which the withdrawal opening is in the form of a nozzle which projects upwardly inside the crucible to form a collecting region, between itself and the crucible wall, to retain any reaction products formed on the said wall, and projects downwardly from the lower outside wall of the crucible to prevent spreading of the melt over the outer bottom wall of the crucible.

10. The invention defined in claim 7 in which the nozzle provides a passage which flares upwardly and flares outwardly downwardly.

11. An apparatus for making a crystalline body, by pulling a crystal from a melt of material, comprising a melting crucible containing said melt therein, means for supplying the material to the inside of the crucible in controlled amount, the crucible having a restricted withdrawal opening below the surface of the melt, and means for supporting a crystal-pulling solid piece of the said crystalline semiconductor body with its axis centered with respect to the withdrawal opening and for adjusting the distance between an end of the said piece and the withdrawal opening closely so that only a drop of melt can issue from the withdrawal opening and for gradually removing it to permit further issuance of melt, and radiant heating means about the lower portion of the crucible, including the withdrawal opening, the withdrawn melt being out of contact with the crucible and the radiant heating means when it solidifies on the said end of the solid piece.

12. The invention defined in claim 11, in which the withdrawal opening is in the form of a nozzle which projects upwardly inside the crucible to form a collecting region, between itself and the crucible wall, to retain any reaction products formed on the said wall, and projects downwardly from the lower outside wall of the crucible to prevent spreading of the melt over the outer bottom wall of the crucible.

13. The invention defined in claim 12, in which the nozzle provides a passage which flares upwardly and flares outwardly downwardly.

14. A device for pulling a rod-shaped semiconductor body from a molten mass of semiconductor material, comprising a crucible, the crucible having an intake aperture for semiconductor material, means for supplying semiconductor material to the crucible intake aperture during the pulling operation, to replenish material removed in said operation, means for heating the material in the crucible, the crucible being provided with a restricted outlet opening for molten liquid, said opening being beneath the liquid level of the melt, a holder for the rod being produced, the holder being located opposite the outlet opening, means for relative displacement of the holder and the crucible in the exit direction of melt from said outlet opening, a small body of the melt emerging from the outlet opening and moving into the space between the outlet opening and an end of the semiconductor rod supported by the holder, and undergoing solidification and becoming part of said rod.

15. The device of claim 14, and means for turning the rod about its longitudinal axis.

16. The apparatus defined in claim 14, the outlet opening being in the form of a nozzle which projects upwardly inside the crucible to form a collecting region, between itself and the crucible wall, to retain any reaction products formed on the said wall, and projects downwardly from the lower outside wall of the crucible to prevent spreading of the melt over the outer bottom wall of the crucible.

17. The apparatus defined in claim 14, and an adjustable needle valve in said outlet opening.

18. The apparatus defined in claim 14, the outlet opening being in the bottom of the crucible and having therein an outlet nozzle directed downwardly.

19. The apparatus defined in claim 14, the outlet opening being in the form of a downwardly directed nozzle in the bottom of the crucible, and means for rotating the crucible about the axis of the nozzle passage.

20. The apparatus defined in claim 14, the crucible being in the form of a U-tube having upwardly directed limbs of different height, said outlet opening for melt being upwardly directed and being in the lower limb.

21. The apparatus defined in claim 14, and a ring-shaped heater located about the outlet opening, said opening being substantially in the center of the ring.

22. The apparatus defined in claim 14, a ring-shaped heater located about the outlet opening, said opening being substantially in the center of the ring, and a second ring-shaped heater about the lateral wall of the crucible to pre-heat the crucible, comprising said means for heating the material.

23. The apparatus defined in claim 14, and a heat deflector mounted near the said outlet opening of the crucible.

24. The apparatus defined in claim 14, the crucible having a capacity which is at most 1/10 of the volume of the semiconductor rod produced.

References Cited in the file of this patent

UNITED STATES PATENTS

| | | |
|---|---|---|
| 1,549,597 | Miller | Aug. 11, 1925 |
| 1,621,446 | Watson | Mar. 15, 1927 |
| 1,933,341 | Richardson | Oct. 31, 1933 |
| 2,214,976 | Stockbarger | Sept. 17, 1940 |
| 2,398,952 | Nachod | Apr. 23, 1946 |
| 2,634,554 | Barnes | Apr. 14, 1953 |
| 2,647,043 | Imber | July 28, 1953 |
| 2,657,122 | Chaudoye et al. | Oct. 27, 1953 |
| 2,664,349 | Sable | Dec. 29, 1953 |
| 2,683,676 | Little et al. | July 13, 1954 |
| 2,768,914 | Buehler et al. | Oct. 30, 1956 |

FOREIGN PATENTS

| | | |
|---|---|---|
| 243,251 | Great Britain | Nov. 26, 1925 |

OTHER REFERENCES

Holden, in Transactions of the American Society for Metals, vol. 42, 1950, pages 319 to 335.